(12) United States Patent
Ishizeki et al.

(10) Patent No.: US 10,514,025 B2
(45) Date of Patent: Dec. 24, 2019

(54) PREHEATER FOR COMPRESSOR

(71) Applicant: DAIKIN INDUSTRIES, LTD., Osaka-shi, Osaka (JP)

(72) Inventors: Shinichi Ishizeki, Osaka (JP); Hiroshi Doumae, Osaka (JP); Yuusuke Kishiwaki, Osaka (JP); Masahide Fujiwara, Osaka (JP); Motonobu Ikeda, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 139 days.

(21) Appl. No.: 15/520,232

(22) PCT Filed: Dec. 4, 2015

(86) PCT No.: PCT/JP2015/084154
§ 371 (c)(1),
(2) Date: Apr. 19, 2017

(87) PCT Pub. No.: WO2016/093169
PCT Pub. Date: Jun. 16, 2016

(65) Prior Publication Data
US 2017/0314815 A1 Nov. 2, 2017

(30) Foreign Application Priority Data
Dec. 10, 2014 (JP) .................. 2014-250056

(51) Int. Cl.
F04B 39/04 (2006.01)
G01F 23/26 (2006.01)
F25B 1/00 (2006.01)

(52) U.S. Cl.
CPC ............... *F04B 39/04* (2013.01); *F25B 1/00* (2013.01); *G01F 23/263* (2013.01);
(Continued)

(58) Field of Classification Search
CPC .... F04B 39/02; F04B 39/0207; F04B 39/023; F04B 39/04; F04B 49/06; F04B 49/065;
(Continued)

(56) References Cited

U.S. PATENT DOCUMENTS 4,543,797 A * 10/1985 Vogel ................. H02H 5/00
361/178
4,686,857 A * 8/1987 Kato .................. G01N 33/2888
324/698
(Continued)

FOREIGN PATENT DOCUMENTS

EP 2966380 A1 1/2016
JP 62-175279 U 11/1987
(Continued)

OTHER PUBLICATIONS

Author: Thermo Energy Corporation Title: Radio-Frequency Dielectric Heating in Industry Date published(mm/yyyy): Mar. 1987 Date accessed (mm/dd/yyyy): Oct. 24, 2018 Link: http://infohouse.p2ric.org/ref/39/38699.pdf.*

*Primary Examiner* — Kenneth J Hansen
*Assistant Examiner* — Chirag Jariwala
(74) *Attorney, Agent, or Firm* — Birch, Stewart, Kolasch & Birch, LLP

(57) ABSTRACT

A preheater for a compressor that is capable of heating a lubricant oil efficiently with smaller power is provided. A preheater for a compressor includes: a capacitive oil surface sensor that is provided at a compressor used in a refrigerating cycle, and detects an oil surface of a lubricant oil A in the compressor; and a power supply unit that applies high-frequency voltage to the oil surface sensor.

3 Claims, 3 Drawing Sheets

(52) U.S. Cl.
CPC ........ *G01F 23/266* (2013.01); *F25B 2500/27* (2013.01); *F25B 2500/31* (2013.01); *F25B 2600/024* (2013.01); *F25B 2700/03* (2013.01); *F25B 2700/04* (2013.01); *F25B 2700/2105* (2013.01)

(58) Field of Classification Search
CPC ................ F04B 53/18; F04B 2203/021; F04B 2203/041; F04B 2205/503; F25B 31/0022; F25B 31/02; F25B 49/00; F25B 49/02; F25B 49/022; F25B 2500/05; F25B 2500/06; F25B 2500/08; F25B 2500/16; F25B 2500/21; F25B 2500/27; F25B 2600/02; F25B 2600/021; F25B 2600/024; F25B 2700/21; F25B 2700/2105; F25B 2700/03; F25B 2700/04; F25B 31/004; F25B 2500/03; F25B 31/002; G01F 23/26; G01F 23/263; G01F 23/265; G01F 23/266; G01F 23/268

USPC ............. 62/84, 193; 73/19.11, 304 R, 304 C
See application file for complete search history.

(56) References Cited

U.S. PATENT DOCUMENTS

| | | | |
|---|---|---|---|
| 8,966,915 B2* | 3/2015 | Takeuchi | F25B 49/02 62/192 |
| 10,036,657 B2* | 7/2018 | Reindl | G01D 5/24 |
| 2012/0096881 A1 | 4/2012 | Sakanobe et al. | |

FOREIGN PATENT DOCUMENTS

| | | | | |
|---|---|---|---|---|
| JP | S-62175279 U | * | 11/1987 | |
| JP | 9-178689 A | | 7/1997 | |
| JP | 10-111207 A | | 4/1998 | |
| JP | 2010-101606 A | | 5/2010 | |
| JP | 2011-27334 A | | 2/2011 | |
| JP | 2014-126309 A | | 7/2014 | |
| JP | 2014-129802 A | | 7/2014 | |
| WO | WO-2006117033 A1 | * | 11/2006 | ........... G01N 27/226 |

* cited by examiner

PREHEATER FOR COMPRESSOR

TECHNICAL FIELD

The present invention relates to a preheater for a compressor used in a refrigerating cycle.

BACKGROUND ART

There is known an air conditioner that heats or cools air inside a room of a building or the like through the vapor-compression refrigerating cycle.

An air conditioner of this kind is associated with "the stagnation phenomenon", in which a refrigerant condenses in a compressor whose temperature has been dropped during a halt of the air conditioner, and dissolves in a lubricant oil. When the operation is resumed with the refrigerant stagnation, the refrigerant suddenly vaporizes and causes oil foaming. Thus, the compressor may draw in the refrigerant and also the lubricant oil, thereby increasing oil loss and inviting poor lubrication of the compressor.

There have been conventionally proposed techniques for preventing the stagnation of a refrigerant in a compressor. One of the techniques proposes mounting a heater externally to the casing of the compressor, so as to heat the lubricant oil in the compressor during a halt of the air conditioner (e.g., see Patent Literature 1). Another one of the techniques proposes open-phase energizing a motor of the compressor to cause a coil to generate heat, so as to heat the lubricant oil in the compressor (e.g., see Patent Literature 2).

CITATION LIST

Patent Literature

Patent Literature 1: Japanese Unexamined Patent Publication No. 2014-126309
Patent Literature 2: Japanese Unexamined Patent Publication No. 2011-27334

SUMMARY OF INVENTION

Technical Problem

In the case where the casing of the compressor is heated by a heater, naturally provision of the heater increases costs. Further, since the lubricant oil is indirectly heated via the casing of the compressor, efficiency is poor and enormous power and time are required.

On the other hand, in the case where the motor of the compressor is open-phase energized, power is consumed not only by the coil of the motor but also by the power module such as an inverter circuit. This results in great power loss. Further, since the heat of the coil of the motor is transferred to the lubricant oil by air propagation, it takes time to raise the temperature of the lubricant oil and therefore efficiency is poor.

An object of the present invention is to provide a preheater for a compressor that is capable of heating a lubricant oil efficiently with smaller power.

Solution to Problem (1) A preheater for a compressor of the present invention includes:
a capacitive oil surface sensor that is provided at a compressor used in a refrigerating cycle, and detects an oil surface of a lubricant oil in the compressor; and
a power supply unit that applies high-frequency voltage to the oil surface sensor.

With this structure, by applying the high-frequency voltage to the capacitive oil surface sensor, the lubricant oil, which is a dielectric, can be heated by dielectric heating. Accordingly, without the necessity of separately providing a heater or the like for heating, the lubricant oil can be directly heated using the oil surface sensor. Thus, the lubricant oil can be heated efficiently. Further, the voltage applied to the oil surface sensor for carrying out the dielectric heating is merely required to be of high frequency. Therefore, the applied voltage is not required to be high, which can reduce the power consumption.

(2) The high-frequency voltage is preferably applied during a halt of the compressor.

This structure prevents any temperature drop of the lubricant oil during a halt of the compressor.

(3) As the power supply unit, an oscillator circuit that generates a clock signal in a control unit for controlling the compressor is preferably used.

The processor of the control unit structured by a microcomputer and the like operates based on clock signals formed by high-frequency voltage signals. Here, applying the clock signals to the oil surface sensor eliminates the necessity of separately providing a power supply dedicated for heating of the lubricant oil. Thus, a simplified structure and reduced costs can be achieved.

(4) The preheater preferably further includes a switching unit that enables and disables the application of the high-frequency voltage from the oscillator circuit to the oil surface sensor, according to a predetermined preheating condition.

Thus, heating of the lubricant oil with the oil surface sensor can be performed as necessary.

(5) The oscillator circuit is preferably disposed near the oil surface sensor.

When the oscillator circuit and the capacitive oil surface sensor are distanced from each other, the high-frequency component may be cancelled by the resistive component of the electric wiring through which the high-frequency signal passes, resulting in obtuse (rounded) waveforms. Accordingly, disposing the oscillator circuit near the capacitive oil surface sensor ensures application of the high-frequency voltage to the capacitive oil surface sensor.

Advantageous Effects of Invention

The present invention realizes efficient heating of a lubricant oil with smaller power.

DESCRIPTION OF EMBODIMENTS

In the following, a description will be given of an embodiment of the present invention with reference to the drawings.

Figure 1:
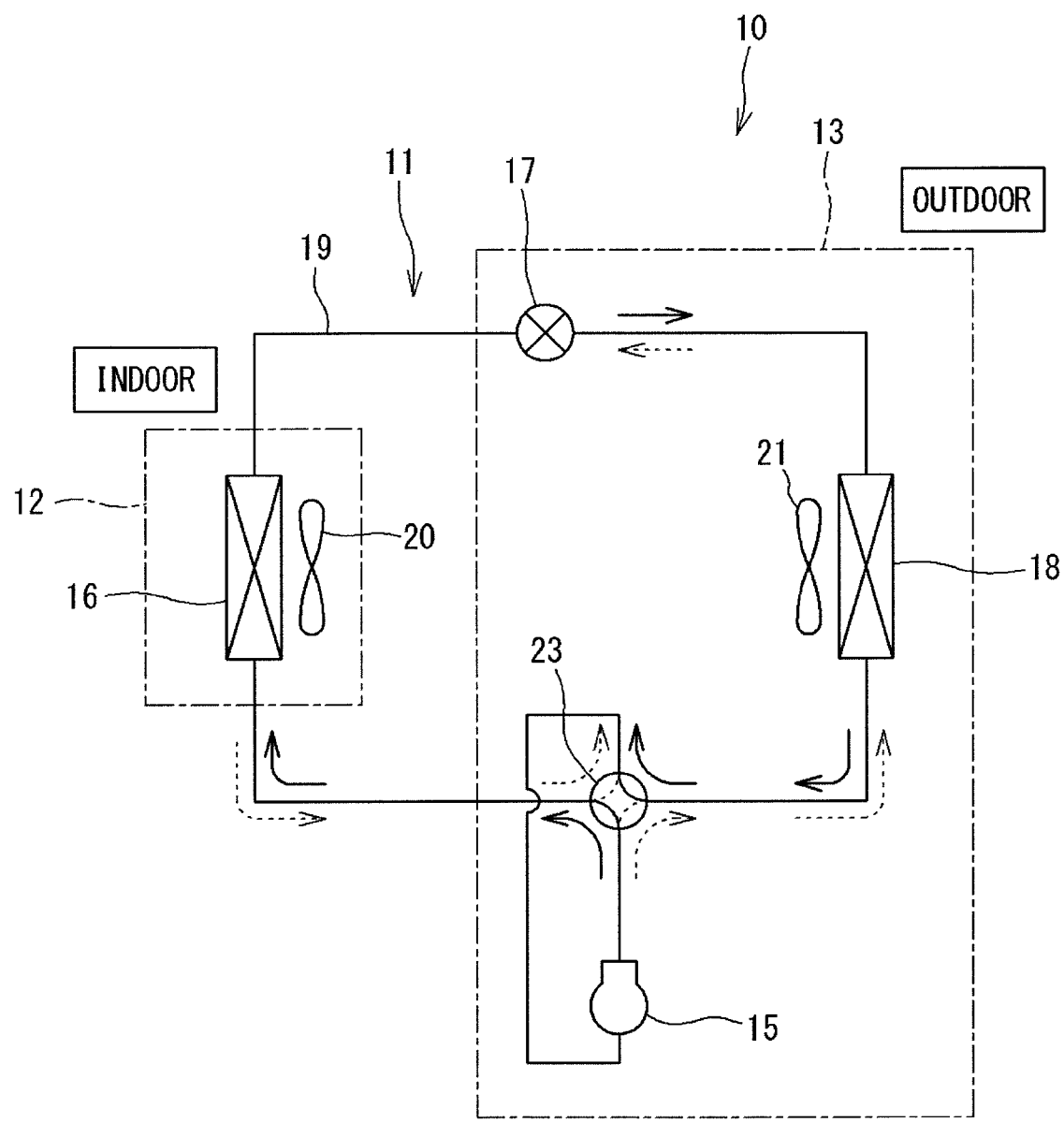
FIG. 1 is a schematic configuration diagram of an air conditioner according to an embodiment of the present invention.

FIG. 1 is a schematic configuration diagram of an air conditioner according to an embodiment of the present invention.

The air conditioner 10 of the present embodiment adjusts the temperature inside a room through the vapor-compression refrigerating cycle. The air conditioner 10 includes an indoor unit 12, an outdoor unit 13, and a refrigerant circuit 11 provided across the indoor unit 12 and the outdoor unit 13.

The refrigerant circuit 11 includes a compressor 15 that compresses a refrigerant to generate a high-temperature and high-pressure gas refrigerant, an indoor-side heat exchanger 16, an electronic expansion valve (expansion means) 17 that reduces the pressure of the refrigerant to generate a low-temperature and low-pressure liquid refrigerant, an outdoor-side heat exchanger 18, and a refrigerant piping 19 that sequentially connects the foregoing constituents. Further, the indoor-side heat exchanger 16 and the outdoor-side heat exchanger 18 are respectively provided with blower fans 20, 21 which are provided so as to oppose to each other.

A four-way switching valve 23 is provided at the refrigerant piping 19. The flow of the refrigerant is reversed by switching of the four-way switching valve 23. Thus, the refrigerant discharged from the compressor 15 can be supplied to the outdoor-side heat exchanger 18 or the indoor-side heat exchanger 16, while the outdoor-side heat exchanger 18 and the indoor-side heat exchanger 16 are switched. That is, the cooling operation and the heating operation can be switched.

Specifically, in the heating operation mode, the four-way switching valve 23 is switched in a manner indicated by solid lines, so that the refrigerant flows in the direction indicated by solid-line arrows. Thus, the refrigerant discharged from the compressor 15 is supplied to the indoor-side heat exchanger 16, and the refrigerant having passed through the expansion valve 17 is supplied to the outdoor-side heat exchanger 18. At this time, the indoor-side heat exchanger 16 functions as a condenser, and condenses and liquefies the high-temperature and high-pressure gas refrigerant. The outdoor side heat exchanger 18 functions as an evaporator, and vaporizes and gasifies the low-temperature and low-pressure liquid refrigerant.

In the cooling operation mode, the four-way switching valve 23 is switched in a manner indicated by broken lines to reverse the flow of the refrigerant, so that the refrigerant flows in the direction indicated by broken-line arrows. Thus, the indoor-side heat exchanger 16 functions as an evaporator and the outdoor-side heat exchanger 18 functions as a condenser. Note that, operations of the expansion valve 17, the four-way switching valve 23, the compressor 15, and the blower fans 20, 21 are controlled by a control apparatus according to ON/OFF of an operational switch or outputs of a temperature sensor and the like.

Figure 2:
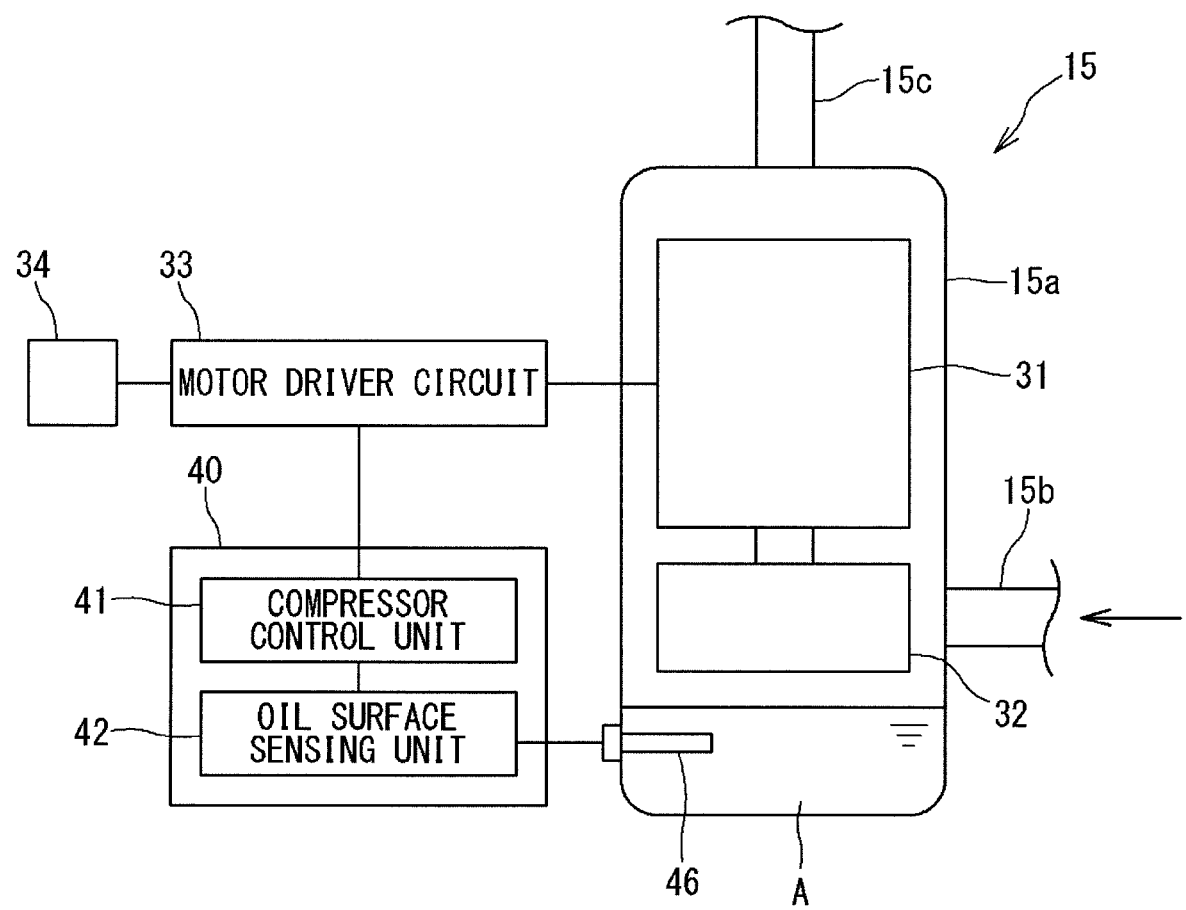
FIG. 2 is a schematic configuration diagram showing a control apparatus of a compressor.

As shown in FIG. 2, a motor 31 and a compressing part 32 are housed in a casing 15a of the compressor 15. Further, the casing 15a is provided with an inlet 15b and an outlet 15c for the refrigerant. The compressor 15 drives the compressing part 32 by the rotary power of the motor 31 to compress the refrigerant.

The compressing part 32 is, for example, of a scroll type or a rotary type. In the lower part of the casing 15a, a lubricant oil A for lubricating inside the compressor 15 is stored.

The motor 31 is driven by a motor driver circuit 33. The motor driver circuit 33 includes a rectifying and smoothing circuit that rectifies and smoothes current from a commercial power supply 34, and an inverter circuit that includes a power device such as IGBT. The motor driver circuit 33 is controlled by a control apparatus 40.

The control apparatus 40 has functions as a compressor control unit 41 and an oil surface sensing unit 42. The compressor control unit 41 includes a microcomputer and the like that provide control signals to the motor driver circuit 33. The microcomputer has a processor 44 (see FIG. 3), memory, and the like.

Figure 3:
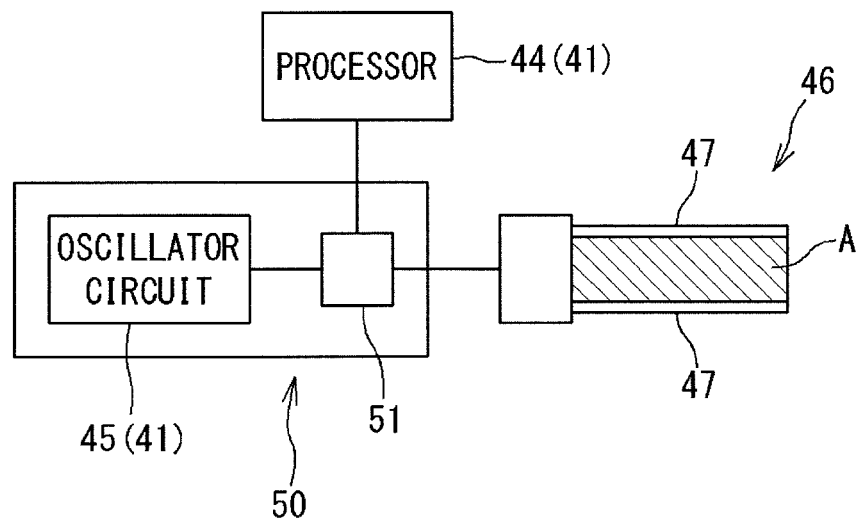
FIG. 3 is a schematic configuration diagram showing a preheater.

As shown in FIG. 3, the processor 44 in the compressor control unit 41 receives clock signals generated by an oscillator circuit 45, and operates based on the clock signals. The clock signals are formed by high-frequency voltage signals of several megahertz to several tens of megahertz.

The oil surface sensing unit 42 detects, with a capacitive oil surface sensor 46, the oil surface of the lubricant oil A housed in the casing 15a of the compressor 15. Specifically, the oil surface sensor 46 having a pair of electrodes 47 is mounted in the casing 15a of the compressor 15. The oil surface sensing unit 42 detects the capacitance between the pair of electrodes 47. Since the lubricant oil A is a dielectric, the capacitance changes depending on the presence/absence of the lubricant oil A and the amount of the lubricant oil A between the pair of electrodes 47. Accordingly, by detecting any change in the capacitance, the oil surface sensing unit 42 can detect the oil surface of the lubricant oil A in the casing 15a. The processor 44 also processes any detection signals of the oil surface sensor 46, and functions also as the oil surface sensing unit 42.

The air conditioner 10 according to the present embodiment is provided with a preheater 50 that heats the lubricant oil A in the compressor 15. The preheater 50 heats the lubricant oil A in the compressor 15 whose temperature has dropped during a halt of the air conditioner 10, thereby preventing the refrigerant from dissolving to the lubricant oil A and suppressing any oil foaming or oil loss upon resumption of the operation.

The preheater 50 according to the present embodiment includes the capacitive oil surface sensor 46, and a power supply unit 45 that applies high-frequency voltage to the oil surface sensor 46. As the power supply unit 45, an oscillator circuit that provides clock signals to the processor 44 of the compressor control unit 41 is used.

Further, the preheater 50 includes a switching unit 51 between the oscillator circuit 45 and the oil surface sensor 46. The switching unit 51 switches between a first mode of providing high-frequency voltage signals generated by the oscillator circuit 45 to the processor 44, and a second mode of providing such signals to the oil surface sensor 46. In other words, the switching unit 51 enables and disables application of high-frequency voltage by the oscillator circuit 45 to the oil surface sensor 46. Further, in the first mode, the switching unit 51 connects the oil surface sensor 46 to the processor 44 so that the oil surface sensor 46 can transmit detection signals to the processor 44.

During a halt of the air conditioner 10, the preheater 50 connects the oscillator circuit 45 to the oil surface sensor 46 with the switching unit 51, thereby applying high-frequency voltage to the oil surface sensor 46.

When a dielectric is disposed in a high-frequency electric field, the dielectric generates heat by dielectric loss. In general, this phenomenon is called "the dielectric heating". The preheater 50 according to the present embodiment applies high-frequency voltage across a pair of electrodes 47 structuring the oil surface sensor 46, so that the dielectric heating occurs at the lubricant oil A present between the electrodes 47.

In this manner, the lubricant oil A can be heated during a halt of the air conditioner 10 and prevented from temperature drop. This prevents oil foaming or oil loss upon resumption of the operation.

Further, the preheater 50 causes the lubricant oil A itself to generate heat. Accordingly, as compared to the conventional techniques where the lubricant oil is indirectly heated, such as the case where the casing 15a of the compressor 15 is heated with a heater or the case where the motor 31 of the compressor 15 is open-phase energized to thereby cause the motor 31 to generate heat, the preheater 50 is advantageous in being capable of heating the lubricant oil A efficiently in a short time.

Further, since the preheater 50 is structured to include the oil surface sensor 46 and the oscillator circuit 45 in the compressor control unit 41, any electrodes or a power supply unit dedicated to the preheater 50 can be dispensed with. This prevents any increase in costs or complication in structure in providing the preheater 50.

The switching unit 51 can switch, when a predetermined preheating condition is satisfied, so that the oscillator circuit 45 is connected to the oil surface sensor 46. This preheating condition may be a condition where the refrigerant stagnation may occur. For example, it may be a condition where the temperature of the lubricant oil A in the compressor 15, the temperature of the casing 15a, or the outside-air temperature becomes equal to or less than a predetermined threshold value.

The oscillator circuit (power supply unit) 45 of the preheater 50 is disposed near the compressor 15. That is, the control board of the control apparatus 40 including the oscillator circuit 45 is disposed near the compressor 15. Specifically, the line length from the compressor 15 to the oscillator circuit 45, or to the switching unit 51 and other substrate is set to 50 cm or smaller. This prevents the waveform of the high-frequency voltage from being rounded by the resistive component of the electric wiring connecting between the oscillator circuit 45 and the oil surface sensor 46. Thus, high-frequency voltage is surely applied to the oil surface sensor 46.

The present invention is not limited to the embodiment described above, and any change may be made as appropriate within the scope of the invention stated in the scope of claims.

For example, without being limited to the air conditioner, the present invention is applicable to various kinds of apparatuses that use the refrigerating cycle, such as a freezer, a refrigerator, or a humidity control apparatus. Further, the present invention is also applicable to a simultaneous heating and cooling air conditioner.

Still further, the structure of the refrigerant circuit is not limited to that described in the embodiment. For example, the refrigerant circuit may include other accessories such as an oil separator and an accumulator.

The power supply unit of the preheater 50 may not be the oscillator circuit 45, and may be a high-frequency voltage circuit dedicated to the preheater 50.

High-frequency voltage may be applied to the oil surface sensor 46 for the dielectric heating when the compressor 15 is in operation.

REFERENCE SIGNS LIST

10: AIR CONDITIONER
11: REFRIGERANT CIRCUIT
15: COMPRESSOR
31: MOTOR
32: COMPRESSING PART
33: MOTOR DRIVER CIRCUIT
34: COMMERCIAL POWER SUPPLY
40: CONTROL APPARATUS
41: COMPRESSOR CONTROL UNIT
42: OIL SURFACE SENSING UNIT
44: PROCESSOR
45: OSCILLATOR CIRCUIT (POWER SUPPLY UNIT)
46: OIL SURFACE SENSOR (CAPACITIVE OIL SURFACE SENSOR)
50: PREHEATER
51: SWITCHING UNIT
A: LUBRICANT OIL

The invention claimed is:

1. A preheater for a compressor, comprising:
a capacitive oil surface sensor comprising a pair of electrodes provided in the compressor used in a refrigerating cycle, and detecting an oil surface of a lubricant oil in the compressor by detecting any change in a capacitance between the pair of electrodes;
a power supply that supplies frequency voltage signals having a predefined frequency to a switch that switches between a first mode that provides the voltage signals from the power supply to a compressor motor driver circuit and a second mode that provides the voltage signals to the capacitive oil surface sensor, according to a predetermined preheating condition; and
a controller for controlling the compressor motor driver circuit, wherein
the capacitive oil surface sensor heats the lubricant oil by dielectric heating when the voltage signals are supplied to the oil surface sensor,
the power supply includes an oscillator circuit that generates the frequency voltage signals, and
the controller uses the voltage signals received via the switch as a clock signal to control the compressor motor driver circuit.

2. The preheater for a compressor according to claim 1, wherein the frequency voltage signals are supplied to the capacitive oil surface sensor during a halt of the compressor.

3. The preheater for a compressor according to claim 1, wherein the oscillator circuit is disposed near the capacitive oil surface sensor such that a line length from the compressor to the oscillator circuit, or to the switch is 50 cm or shorter.

* * * * *